United States Patent
Du Bois et al.

(10) Patent No.: US 10,345,925 B2
(45) Date of Patent: Jul. 9, 2019

(54) METHODS AND SYSTEMS FOR DETERMINING POSITIONAL DATA FOR THREE-DIMENSIONAL INTERACTIONS INSIDE VIRTUAL REALITY ENVIRONMENTS

(71) Applicant: GOOGLE INC., Mountain View, CA (US)

(72) Inventors: Paul Lamont Du Bois, Oakland, CA (US); Patrick Ryan Hackett, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/666,885

(22) Filed: Aug. 2, 2017

(65) Prior Publication Data

US 2018/0039341 A1    Feb. 8, 2018

Related U.S. Application Data

(60) Provisional application No. 62/370,414, filed on Aug. 3, 2016.

(51) Int. Cl.
*G06F 1/16* (2006.01)
*G06F 3/01* (2006.01)
(Continued)

(52) U.S. Cl.
CPC .......... *G06F 3/0346* (2013.01); *A63F 13/211* (2014.09); *G06F 1/163* (2013.01);
(Continued)

(58) Field of Classification Search
CPC ........ A63F 13/211; G06F 1/163; G06F 3/011; G06F 3/012; G06F 3/017; G06F 3/0346; G06F 3/038; G06F 3/04815; H04W 4/80
See application file for complete search history.

(56) References Cited

U.S. PATENT DOCUMENTS

| 7,301,648 | B2 | 11/2007 | Foxlin |
| 7,636,645 | B1 * | 12/2009 | Yen .......................... A63F 13/02 702/150 |

(Continued)

FOREIGN PATENT DOCUMENTS

| EP | 2485119 A2 | 8/2012 |
| EP | 3007496 A1 | 4/2016 |
| WO | 2015/183621 A1 | 12/2015 |

OTHER PUBLICATIONS

International Search Report and Written Opinion received for PCT Patent Application No. PCT/US2017/045054, dated Oct. 23, 2017, 16 pages.

(Continued)

*Primary Examiner* — Michael J Jansen, II
(74) *Attorney, Agent, or Firm* — Brake Hughes Bellermann LLP

(57) ABSTRACT

In one general aspect, systems and methods are described for determining positional data for three-dimensional interactions inside virtual reality environments. The methods may include receiving inertial measurement unit (IMU) data from at least one mobile device of a plurality of mobile devices operating in a virtual reality environment, obtaining absolute position and orientation data from at least one tracked controller, comparing the IMU data from the at least one mobile device with the absolute position and orientation data of the at least one tracked controller, detecting a correlation between the IMU data from the at least one mobile device and the absolute position and orientation data of the at least one tracked controller. Based on the detected correlation, the method may include determining absolute position and orientation for the at least one mobile device based on a determined relative orientation for the at least one tracked controller.

20 Claims, 6 Drawing Sheets

(51) Int. Cl.
| | |
|---|---|
| *H04W 4/80* | (2018.01) |
| *G06F 3/038* | (2013.01) |
| *A63F 13/211* | (2014.01) |
| *G06F 3/0346* | (2013.01) |
| *G06F 3/0481* | (2013.01) |

(52) U.S. Cl.
CPC .............. *G06F 3/011* (2013.01); *G06F 3/012* (2013.01); *G06F 3/017* (2013.01); *G06F 3/038* (2013.01); *G06F 3/04815* (2013.01); *H04W 4/80* (2018.02)

(56) References Cited

U.S. PATENT DOCUMENTS

| | | | | |
|---|---|---|---|---|
| 8,626,471 | B2* | 1/2014 | Kennedy | G01P 21/00 340/480 |
| 8,678,282 | B1* | 3/2014 | Black | F41G 3/16 235/13 |
| 8,961,305 | B2* | 2/2015 | Takeda | A63F 13/02 463/31 |
| 9,189,082 | B2* | 11/2015 | Hildreth | G06F 3/0317 |
| 9,229,540 | B2* | 1/2016 | Mandella | G06F 3/03545 |
| 9,235,241 | B2* | 1/2016 | Newham | G06F 1/1694 |
| 9,239,618 | B2* | 1/2016 | Cho | G06F 3/011 |
| 9,247,212 | B2* | 1/2016 | Bose | H04N 7/18 |
| 9,551,873 | B2* | 1/2017 | Zalewski | G06F 3/01 |
| 9,571,625 | B2* | 2/2017 | Kim | H04M 1/7253 |
| 9,606,363 | B2* | 3/2017 | Zalewski | G06F 3/01 |
| 9,613,147 | B2* | 4/2017 | Carlson | G08C 19/00 |
| 9,696,547 | B2* | 7/2017 | Kinnebrew | G06F 3/147 |
| 9,726,498 | B2* | 8/2017 | Meduna | G06F 1/3206 |
| 9,885,232 | B2* | 2/2018 | Close | G01P 15/132 |
| 9,907,103 | B2* | 2/2018 | Chen | H04W 76/14 |
| 9,916,496 | B2* | 3/2018 | Vandonkelaar | A63F 13/212 |
| 9,922,465 | B2* | 3/2018 | Goslin | G06T 19/006 |
| 9,965,675 | B2* | 5/2018 | Schinas | G06K 9/00335 |
| 9,996,975 | B2* | 6/2018 | Herman | G06T 13/00 |
| 10,078,377 | B2* | 9/2018 | Balan | G02B 27/0093 |
| 10,134,192 | B2* | 11/2018 | Tomlin | G02B 27/0172 |
| 10,146,334 | B2* | 12/2018 | Balan | H04N 13/204 |
| 10,146,335 | B2* | 12/2018 | Balan | H04N 13/204 |
| 10,191,561 | B2* | 1/2019 | Katz | G06F 3/0304 |
| 10,198,874 | B2* | 2/2019 | Dearman | G06T 19/20 |
| 2006/0053371 | A1* | 3/2006 | Anderson | G06F 3/016 715/701 |
| 2010/0259474 | A1* | 10/2010 | Hildreth | G06F 3/0317 345/156 |
| 2011/0029275 | A1* | 2/2011 | Kennedy | G01P 21/00 702/141 |
| 2011/0029903 | A1* | 2/2011 | Schooleman | G06F 3/011 715/764 |
| 2011/0037712 | A1* | 2/2011 | Kim | H04M 1/7253 345/173 |
| 2011/0190052 | A1* | 8/2011 | Takeda | A63F 13/02 463/31 |
| 2012/0038549 | A1* | 2/2012 | Mandella | G06F 3/011 345/156 |
| 2013/0128022 | A1* | 5/2013 | Bose | H04N 7/18 348/77 |
| 2013/0342571 | A1* | 12/2013 | Kinnebrew | G06F 3/147 345/633 |
| 2014/0028539 | A1* | 1/2014 | Newham | G06F 1/1694 345/156 |
| 2014/0149060 | A1* | 5/2014 | Meduna | G06F 1/3206 702/94 |
| 2014/0247279 | A1 | 9/2014 | Nicholas et al. | |
| 2015/0234456 | A1* | 8/2015 | Cho | G06F 3/011 345/156 |
| 2015/0235453 | A1* | 8/2015 | Schowengerdt | G06F 3/012 345/633 |
| 2015/0235583 | A1* | 8/2015 | Schowengerdt | G06F 3/012 345/690 |
| 2015/0269780 | A1* | 9/2015 | Herman | G06T 13/00 345/633 |
| 2015/0339388 | A1* | 11/2015 | Carlson | G08C 19/00 707/722 |
| 2015/0348327 | A1* | 12/2015 | Zalewski | G06F 3/01 345/419 |
| 2016/0012643 | A1 | 1/2016 | Kezele et al. | |
| 2016/0098095 | A1* | 4/2016 | Gonzalez-Banos | G06F 3/017 345/156 |
| 2016/0105923 | A1* | 4/2016 | Chen | H04W 76/14 455/41.2 |
| 2016/0158640 | A1 | 6/2016 | Gupta et al. | |
| 2016/0209658 | A1* | 7/2016 | Zalewski | G06F 3/01 |
| 2016/0259030 | A1* | 9/2016 | Jiao | G01S 3/023 |
| 2016/0364013 | A1* | 12/2016 | Katz | G06F 3/0304 |
| 2016/0378204 | A1* | 12/2016 | Chen | G01C 3/08 345/156 |
| 2017/0123487 | A1* | 5/2017 | Hazra | G06F 3/015 |
| 2017/0243324 | A1* | 8/2017 | Mierle | G06F 3/012 |
| 2017/0244811 | A1* | 8/2017 | McKenzie | H04W 76/14 |
| 2017/0262049 | A1* | 9/2017 | Kim | G06F 3/012 |
| 2017/0277940 | A1* | 9/2017 | Vandonkelaar | A63F 13/212 |
| 2017/0287219 | A1* | 10/2017 | Poulos | G02B 27/0172 |
| 2017/0322623 | A1* | 11/2017 | McKenzie | G06F 3/013 |
| 2017/0330387 | A1* | 11/2017 | Dearman | G06F 3/011 |
| 2017/0336439 | A1* | 11/2017 | Li | G01C 19/00 |
| 2017/0336882 | A1* | 11/2017 | Tome | G06F 3/011 |
| 2017/0337735 | A1* | 11/2017 | Goslin | G06T 19/006 |
| 2017/0351094 | A1* | 12/2017 | Poulos | G01B 7/003 |
| 2017/0352184 | A1* | 12/2017 | Poulos | G02B 27/0172 |
| 2017/0356282 | A1* | 12/2017 | Close | G01P 15/132 |
| 2017/0357332 | A1* | 12/2017 | Balan | G02B 27/0093 |
| 2017/0357333 | A1* | 12/2017 | Balan | H04N 13/204 |
| 2017/0357334 | A1* | 12/2017 | Balan | H04N 13/204 |
| 2017/0358139 | A1* | 12/2017 | Balan | G02B 27/0172 |
| 2018/0005441 | A1* | 1/2018 | Anderson | G02B 27/017 |
| 2018/0024623 | A1* | 1/2018 | Faaborg | G06F 3/011 |
| 2018/0033204 | A1* | 2/2018 | Dimitrov | G06T 19/006 |
| 2018/0039341 | A1* | 2/2018 | Du Bois | G06F 3/012 |
| 2018/0059777 | A1* | 3/2018 | Kobayashi | G06F 3/011 |
| 2018/0061133 | A1* | 3/2018 | Wu | H04W 4/70 |
| 2018/0075293 | A1* | 3/2018 | Schinas | G06K 9/00335 |
| 2018/0081439 | A1* | 3/2018 | Daniels | G06F 1/163 |
| 2018/0101986 | A1* | 4/2018 | Burns | G06T 19/006 |
| 2018/0107835 | A1* | 4/2018 | Clement | G06F 3/011 |
| 2018/0107839 | A1* | 4/2018 | Clement | G06F 21/6245 |
| 2018/0108179 | A1* | 4/2018 | Tomlin | G02B 27/0172 |
| 2018/0140942 | A1* | 5/2018 | Miller | A63F 13/211 |
| 2018/0157333 | A1* | 6/2018 | Ross | G06F 3/017 |
| 2019/0004325 | A1* | 1/2019 | Connor | G02B 27/2278 |
| 2019/0033988 | A1* | 1/2019 | Hesch | G06F 3/0346 |

OTHER PUBLICATIONS

Virtual Reality Annual International Symposium, IEEE Computer Society Press, The Institute of Electrical and Electronics Engineers, Inc. Mar. 1-5, 1997, 237 pages.
"Calibrate the Xbox 360 Kinect Sensor", Microsoft Support (https://support.xbox.com/en-US/xbox-360/accessories/start-calibration), printed Mar. 17, 2016, 4 pages.
"How to Calibrate you Gaming Controller in Windows 10", How to Geek.com (httpJJwww .IoNIDgaek.oom/241421/haw-1D-calibrats-)"W"-gaming-oontroll•in-wirdcwts-10/), printed Mar. 17, 2016, 8 pages.
International Search Report and Written Opinion from PCT/US2017/032635 , dated Jul. 19, 2017, 10 pages.

* cited by examiner

METHODS AND SYSTEMS FOR DETERMINING POSITIONAL DATA FOR THREE-DIMENSIONAL INTERACTIONS INSIDE VIRTUAL REALITY ENVIRONMENTS

CROSS REFERENCE TO RELATED APPLICATION

This application is a continuation of, and claims priority to U.S. Provisional Application No. 62/370,414, filed on Aug. 3, 2016, entitled "METHODS AND SYSTEMS FOR DETERMINING POSITIONAL DATA FOR THREE-DIMENSIONAL INTERACTIONS INSIDE VIRTUAL REALITY ENVIRONMENTS", the disclosure of which is incorporated herein by reference.

TECHNICAL FIELD

This description generally relates to the field of computer software and more specifically to the field of virtual reality computer software.

BACKGROUND

High quality virtual reality (VR) systems generally allow for multiple tracked objects. Mobile VR viewers can piggyback on these tracked objects to receive tracking information from the objects. However, there may be practical inconveniences involved in the process of setting up such connections between a mobile device and a tracked object.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. In one general aspect, a computer-implemented method is described that includes receiving inertial measurement unit (IMU) data from at least one mobile device of a plurality of mobile devices operating in a virtual reality environment and obtaining absolute position and orientation data from at least one tracked controller of a plurality of controllers operating in the virtual reality environment. In response to receiving a request to determine absolute position and orientation data for the at least one mobile device, the method may include comparing the IMU data from the at least one mobile device with the absolute position and orientation data of the at least one tracked controller. The method may further include detecting a correlation between the IMU data from the at least one mobile device and the absolute position and orientation data of the at least one tracked controller. Based on the detected correlation, the method may include storing data indicating that the at least one mobile device from the plurality of mobile devices is connected to the at least one tracked controller from the plurality of controllers. The method may further include generating a relative orientation for the at least one mobile device based on the stored data and determining absolute position and orientation for the at least one mobile device based on the relative orientation for the at least one tracked controller. The method may also include communicatively coupling the at least one mobile device and the at least one tracked controller, the coupling being based on the determined absolute position and orientation for the at least one mobile device. Other embodiments of this aspect include corresponding computer systems, apparatus, and computer programs recorded on one or more computer storage devices, each configured to perform the actions of the methods.

Implementations may include one or more of the following features. The method as described herein in which communicatively coupling the at least one mobile device and the at least one tracked controller includes wirelessly communicating sensed data from the at least one tracked controller to the at least one mobile device. The method as described herein in which the communicative coupling provides enhanced sensed data to be communicated from the at least one tracked controller to the at least one mobile device. The method as described herein in which the correlation between the IMU data from the at least one mobile device and the absolute position and orientation data of the at least one tracked controller is detected by determining a plurality of movements, in particular of common directional movements being carried out by both the at least one mobile device and the at least one tracked controller in the virtual reality environment. The method as described herein in which the at least one mobile device includes a virtual reality viewer that provides at least three degrees of freedom of data and the at least one tracked controller provides six degrees of freedom of data. The method as described herein in which the detected correlation signifies that the mobile device is rigidly attached to the at least one tracked controller.

The method may further include determining a lack of correlation between the IMU data from the at least one mobile device and the absolute position and orientation of the at least one tracked controller and responding to the request with a communication indicating the lack of correlation.

The method may further include determining that the at least one mobile device is associated with the at least one tracked controller, providing virtual reality content to the at least one mobile device according to the determined absolute position and orientation for the at least one mobile device. The method may further include, in response to determining that one or more additional mobile devices are accessing the virtual reality environment within a predefined proximity to the at least one tracked controller, providing the virtual reality content to the one or more additional mobile devices. The virtual reality content may be provided to the one or more additional mobile devices being adjusted for a determined relative orientation generated for the one or more additional mobile devices.

Implementations of the described techniques may include hardware, a method or process, or computer software on a computer-accessible medium.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
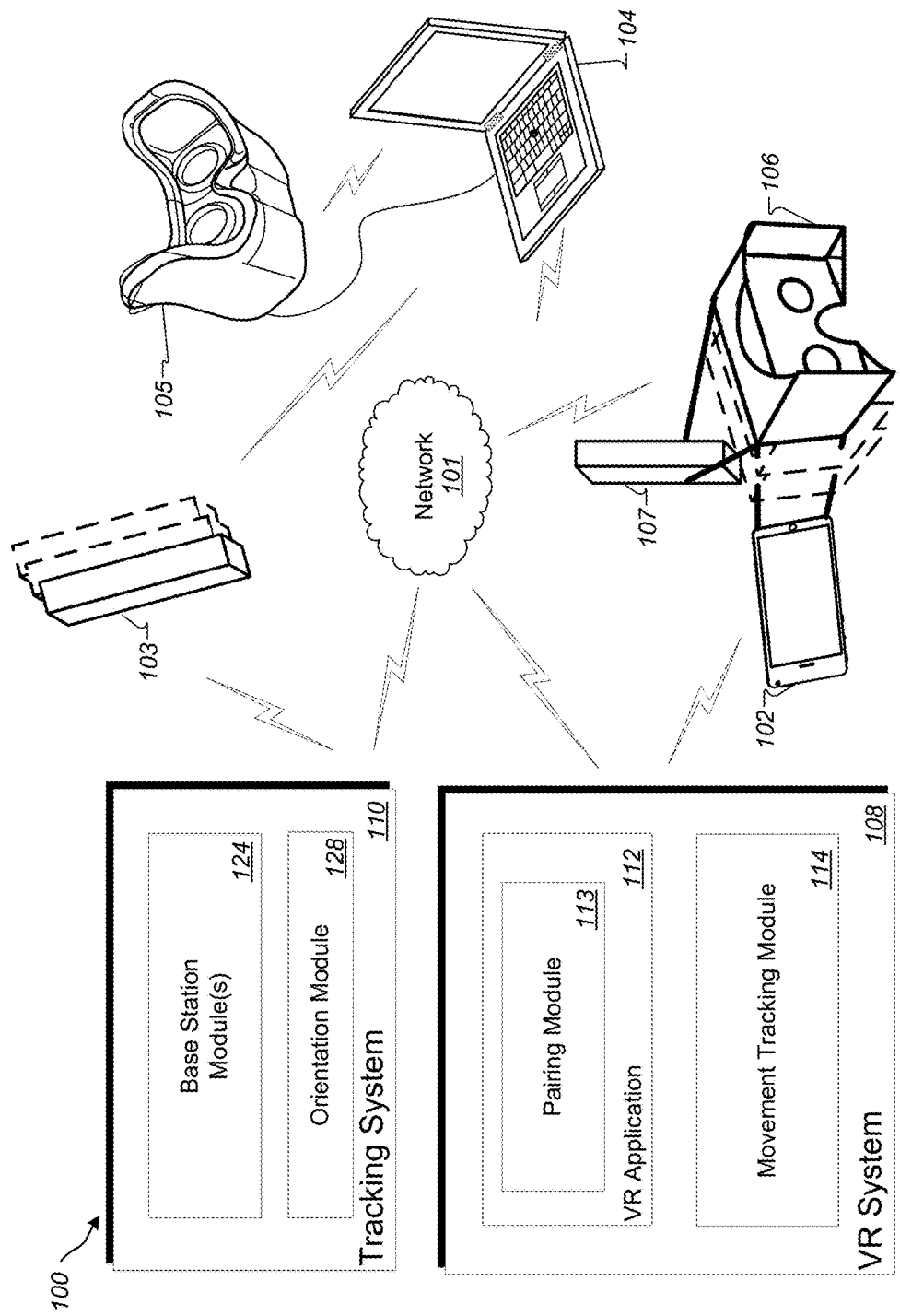
FIG. 1 is a block diagram of an example system for providing VR content and tracking in a three-dimensional virtual reality environment (e.g., a VR space) in which a user can generate and share three-dimensional content.

This disclosure describes a variety of systems and methods for determining positional data for three-dimensional interactions in a shared virtual reality environment (e.g., a VR space). The positional data can be used to share the VR space to allow users to experience co-presence interactions. For example, the systems and methods described in this disclosure can correlate positional data amongst virtual reality devices to provide shared virtual experiences between two or more users accessing a common VR space for gaming, three-dimensional drawing, communicating visually, orally, electronically, and by written methods, and for otherwise interacting with and/or viewing shareable or commonly accessible virtual content.

In some implementations, the systems and methods described in this disclosure can allow a user accessing a high-quality trackable VR system to share their VR experience with multiple other users accessing generally-available mobile device-based VR viewers. For example, VR content accessed by the trackable VR system (e.g., containing sensors that track six degrees of freedom) can be shared and rendered in real time and provided to a number of other users accessing the VR space with VR viewers that are less sophisticated (e.g., containing sensors that track three degrees of freedom). The rendered VR content can be provided in an orientation based at least in part on a relative orientation and/or location associated with each VR viewer device.

In general, rendering VR content for multiple users in a shared VR space can be performed based on correlating data associated with tracked objects and devices used to access the VR space. For example, a user may use a mobile device-based VR viewer capable of providing three degrees of freedom of positional information. In such an example, the user can rigidly attach the mobile device-based VR viewer to a tracked object (e.g., controller, tracked HMD device, etc.). The rigid attachment can include strapping, connecting, seating, or otherwise arranging an attachment between a VR viewer and the tracked object. The rigid attachment can enable the systems and methods described herein to determine which devices may be attached (and functioning together) and can begin to correlate mobile device data (e.g., three degrees of freedom data) with tracked object data (e.g., six degrees of freedom data). Thus, the mobile device (having three degrees of freedom non-absolute orientation data) can be coupled to the tracked object so that 3DOF (degrees of freedom) absolute positional data, 3DOF absolute orientation data, and the VR content associated with the tracked object can be shared with the mobile device. The shared data can enable the mobile device to render co-present VR content in a meaningful way for the user accessing the mobile device-based VR viewer. In particular, the rendering may be adjusted to provide a view of shared data that pertains to the mobile device location within the VR space.

In one non-limiting example, the tracking system can use location data associated with VR devices as a basis to correlate data such as display information, safety information, user data, or other obtainable data. This data can be provided and/or displayed in a synchronous or similar fashion on each device. The correlation may be used to generate an ad-hoc connection between devices in the VR space. Determining the correlation between devices may provide the advantage of a way to associate particular VR devices within a space without user intervention. The correlation can also be used to determine an absolute orientation of one or more devices based on the ad-hoc connection.

Correlating devices capable of determining six degrees of freedom of positional data with devices capable of three degrees of freedom of positional data can provide an advantage of connecting (e.g., pairing, correlating, coupling, communicatively coupling, syncing, etc.) particular devices to operate in synchronous ways. For example, if a first device (e.g., a VR viewer with a mobile phone and three degrees of freedom of non-absolute orientation data) is co-located with a second device (e.g., a tracked HMD device/VR viewer with 3DOF absolute positional data, 3DOF absolute orientation data) within the VR space, then a tracking system can correlate data between the two devices to share resources. For example, the mobile device can gain access to 3DOF absolute positional data and 3DOF absolute orientation data based on a determined association between the mobile device and a tracked controller or device capable of ascertaining six degrees of positional data. Such information can be used to render the same VR content in a device with fewer than six degrees of positional data.

As used herein, the terms co-location or co-presence may pertain to any number of users accessing a VR space from a number of separate physical world locations. In some implementations, co-location or co-presence may pertain to a number of users overlapping VR space of one or more other users.

As used herein, absolute orientation may refer to an exact orientation adjusted to a particular scale. The orientation may include orienting particular data parallel to sea level or other vertical measurement and modeling the data with reference to a horizontal measurement. The modeled data may include scaling, leveling, and other corrections to images or scenes based on a known forward, right, and up directions (e.g., ground truth).

Particular implementations described in this disclosure may enable a user to draw in three dimensions in the VR space. The user can generate beginning and ending points, for example, by drawing in the air to control a cursor associated with a controller, sensor, or other motion trackable device. In one non-limiting example, the user can point and direct an input device such that portions or objects in the VR space can be drawn upon (e.g., with brush strokes, other objects, annotations, texturizers, etc.). The drawings generated may be shared in a VR space that provides a number of users co-present interaction. For example, the systems and methods described herein can enable mobile devices combined with VR viewers to view drawings generated by other users from angles and views rendered based on tracked location and correlation data. In particular, the mobile device may be rigidly attached to a tracked controller device and data associated with the tracked controller can be used to correlate the rigidly attached devices for purposes of determining exact viewing angles to present drawings or other VR content to users in the VR space that are not drawing, but simply wish to view drawings being generated by another user in the VR space. Other virtual interactions and VR content beyond sharing drawing movements and drawn VR content can also be shared between users based on the tracking mechanisms described herein.

In operation, the systems described herein can provide a real-time, properly oriented view of virtual content to a number of users accessing the VR space within a predefined proximity of a user accessing and/or interacting with the same virtual content (e.g., a user giving a lecture and writing notes or pointing to notes for other users, multiple users playing a game or viewing virtual objects, a sketcher sketching virtual drawing content for other users to view). In one non-limiting example, if a number of users are co-located with the sketcher, the systems described herein can detect if a user attaches her VR viewer to a tracked object (e.g., controller) to allow tracking and viewing of VR content on the VR viewer. The VR content may be generated or accessed by another user accessing the VR space with an HMD device/VR headset trackable within six degrees of positional freedom. The view for the users accessing the VR content on the VR viewer may be streamed (e.g., transmitted) with positional data and/or orientation and correction data to an application associated with the VR viewer. The streamed view/data may be provided based on the sketcher's movements and drawing output. In some implementations, a user may interact with VR content in ways other than drawing and those interactions and resulting changes can be shared and rendered with users sharing the same VR space using the methods and systems described herein.

FIG. 1 is a block diagram of an example system for providing VR content and tracking in a three-dimensional (3D) virtual reality environment (e.g., a VR space) in which a user can generate and share 3D virtual content with other users. In general, the environment 100 may provide the 3D VR space, drawing tools/palettes, virtual objects, object manipulation tools, and VR content for a user to access, view, and interact with using the methods, components, and techniques described herein. In particular, environment 100 can provide the user with options for accessing the images, content, virtual objects, and VR controls using eye gaze, hand gestures, head movements, and/or other user-based movements within the VR space. For example, a user can generate 3D drawings in portions of the VR space and other users can interact with such drawings using 2D and 3D input devices, and tools configured to generate artistic drawings or annotations on drawings or other VR objects.

As shown in FIG. 1, the example environment 100 includes a plurality of computing devices that can exchange data over a network 101. The devices may represent clients or servers and can communicate via network 101, or other network. The client devices may include a mobile device, an electronic tablet, a laptop, a desktop, a camera, a game controller, VR glasses, VR headset, VR viewer or HMD device, or other such electronic device that may be used to access VR content. Example VR devices can include, but are not limited to smartphones, laptops, tablets, desktops, Google Cardboard™ viewer, HTC Vive™ controllers, Sixense STEM System™, just to name a few VR devices.

The example environment 100 includes a mobile device 102, one or more example controllers 103, a computing device 104, one or more VR headsets 105 and/or VR viewers 106, controller 107, a VR system 108, and a tracking system 110. Devices 102, 103, 104, 105, and 106 may represent client devices. Mobile device 102, controllers 103 and 107, computing device 104, and VR viewer 106 can include one or more processors and one or more memory devices. In some implementations, any number of mobile devices 102, controllers 103 or 107, VR headsets 105, and VR viewers 106 may be included to function with components of environment 100.

The devices 102, 104, and 105 can execute a client operating system and one or more client applications that can access, control, and/or display VR content on a display device included in each respective device. The VR system 108 and tracking system 110 may represent server devices. In some implementations, device 104 may represent a server device with any number of processors configured to perform the methods described herein.

In general, VR system 108 may include any number of repositories storing images, objects, content and/or virtual reality software modules that can generate, modify, or execute display of virtual reality scenes and content. The devices tracked by the systems described herein may include virtual reality input and output devices. In particular, some user devices may be output devices with tracking in three degrees of freedom while other devices are input (sensor-based) devices with tracking in six degrees of freedom.

The tracking system 110 can be used to track one or more devices used to access the VR space may be tracked based on position, velocity, and acceleration data obtainable from particular computing devices, controllers, and/or base station devices represented in the VR space. For example, data may be obtained from an inertial measurement unit (IMU) associated with one or more devices while location data may be obtained from one or more tracked object (e.g., controllers, VR viewers) and/or base stations associated with the VR space. Additional data may also be obtained from a number of onboard sensors associated with devices accessing the VR space. Such data may pertain to accelerometer and gyroscope data, orientation data, correction data, and/or other sensor data indicating general or specific location information. The systems described herein can use such data to correlate six degrees of freedom of positional information for a tracked object within a predefined range to one or more other devices within the predefined range. The predefined range may be the entire VR space, a subset of the VR space, or other measurable range with respect to a user accessing the VR space.

The tracking system 110 described herein can additionally be used to track user movement while drawing in the VR space and/or other activities performed by a user in the VR space. The movements and drawings generated by such movements can be displayed to other users that are accessing VR content within the predefined range of the user associated with the drawings and user actions. For example, a first user may access the VR space and begin to create VR content by drawing, writing, selecting, or otherwise modifying VR objects. The systems and methods described herein can provide blank canvas space or objects in which to guide the user in generating VR content or in performing VR object manipulations using gestures, brushstrokes, pencil strokes, color application, or other movement or application of markup in the VR space. The VR objects may be provided in the VR space as three-dimensional virtual objects that can function to spark the imagination of the user (e.g., drafter/painter). The VR objects and the VR content placed upon and around the objects can be rotated and/or moved around in the VR space to provide the user with an immersive experience for creating modified content in the VR space.

In another non-limiting example, the environment 100 can track the position and drawing motions of the user, generate artistic or annotated content based on those motions, and provide for moving around the content within the VR space. The movement can be in the x-y plane or y-z plane (or other coordinate system) in which the content is being generated. For example, the user can lift a motion tracked device (i.e., controller) into the VR space (which can show the user her hands via the HMD device). The user can begin to draw/paint on a selected surface normal (oriented in 3D space). In another example, if the user begins to draw a circle surrounding her body, the circle will appear from the motion tracked device as the user begins to draw the circle. The motion tracked device may be shown to the user as a paintbrush, pen, controller, or other selected tool in the VR space. Upon completing any portion of her drawing, the user can tilt the plane/surface normal to begin drawing in another vector space (e.g., another dimension or drawing plane).

Referring back to FIG. 1, the VR headset 105 may represent an HMD device with tracking capabilities connected to at least one controller and/or tracking system, such as controller 103 and tracking system 110, for example. In some implementations, VR headset 105 is wired to computing device 104, as shown in FIG. 1.

The VR viewer 106 may represent virtual reality glasses, eyepieces, mobile HMD devices, or other wearable device capable of displaying virtual reality content when fitted with a display device (e.g., mobile device 102). In operation, the VR viewer 106 can be used to execute a VR application 112, which can playback received and/or processed images to a user. In some implementations, the VR application 112 can be hosted by or interfaced with one or more of the devices 102, 103 104, 106, 108, or 110.

In some implementations, the VR viewer 106 may be configured as a combined device (e.g., mobile HMD device) having both a computing device (e.g., computing device 104) and a VR headset device (e.g., VR headset 105). The combined device may not be tracked in environment 100 in six degrees of freedom. That is, the combined device may lack the connection to tracking system 110 and/or base station modules 124.

To attain six degrees of freedom of positional data, a user can rigidly attach a controller (e.g., controller 107) to device 106. Accordingly, tracking system 110 can correlate particular tracked components and computing devices to infer (e.g., determine) which devices may be attached or functioning together. For example, tracking system 110 can determine that controller 107 is rigidly attached to VR viewer 106 and can infer a relative orientation of controller 107 and mobile device 102 in VR viewer 106. That is, the tracking system 110 can correlate three degrees of freedom of positional data of the mobile device 102 and six degrees of positional data of the controller 107 and can stream (e.g., transmit) the six degrees of freedom positional data to the mobile device 102 so that device 102 can display the same VR content that a user accessing VR headset 105 is currently viewing. The tracking system 110 can determine a proper viewpoint for the VR content and can adjust the VR content to provide the proper view in mobile device 102.

Additional devices are possible and such devices may be configured to be substituted for one another. In some implementations, the devices 102, 103, 104, 106, 108, and 110 can be laptop or desktop computers, smartphones, personal digital assistants, portable media players, tablet computers, gaming devices, or other appropriate computing devices that can communicate, using the network 101, with other computing devices or computer systems.

In some implementations, the tracking system 110 can be configured to determine absolute position and orientation data corresponding to a user accessing VR space while using one or more tracked controllers, such as controller 107. For example, the tracking system 110 can determine ground-truth data corresponding to location data obtained from mobile device 102 and controller 107, for example, by correlating positional data retrieved from both devices.

Each mobile device, such as mobile device 102, being used in the VR space can include at least one IMU that can report angular and linear acceleration data and orientation data relative to a local magnetic north. Such data may pertain to the location data described above with respect to mobile device 102.

The computing device 104 may function to provide VR application 112 from VR system 108, for example. In addition, computing device 104 may be configured as a dispatcher to communicate with either or both of the tracking system 110, VR system 108, and/or the controllers 103 or 107.

In the example environment 100, the VR system 108 can include a VR application 112. The VR application 112 can be configured to execute on or interface to any or all of devices 102, 103, 104, 106, 107, 108, and 110. The VR headset 105 can be connected to device 103 and/or device 104 to access VR content on VR system 108 or tracking data on tracking system 110, for example. In some implementations, VR headset 105 may be connected to controller 103. In other implementations, VR headset 105 may not be connected to controller 103. Devices 102 and VR headset 105 can be connected to device 104, which can provide VR content for display and interactive drawing capabilities.

The VR headset 105 may represent a tracked object in environment 100 and may function as a VR viewer that the user can employ to view VR content. In operation, the VR headset 105 may be connected via wired connection to computing device 104, for example. The VR headset 105 may be configured to receive tracking information from tracking system 110 (e.g., wirelessly receive tracking information). The tracking information can be sent to computing device 104. Computing device 104 may be configured to consume such tracking information and produce visual information that is sent back to VR headset 105.

The controllers 103 and 107 may also represent tracked objects in environment 100. The controllers 103 and 107 may be wirelessly connected to computing device 104. In operation of environment 100, controllers 103 and 107 may wirelessly receive tracking information from tracking system 110, and can also receive user input through buttons or controls (not shown) on the respective controllers. Controller 103 can send user input to computing device 104. Computing device 104 can receive the user input and the tracking information and can use the information to, for example, generate drawings in VR space for view in VR headset 105 and/or VR viewer 106. In one non-limiting example, controller 103 may receive wireless tracking data from base station module 124. Controller 103 may relay the tracking information to computing device 104. For example, the controller 103 may be communicably coupled to computing device 104 (e.g., via USB).

In some implementations, the controller 103 is USB connected to computing device 104 (which may be wireless-USB connected to VR headset 105). The VR headset 105 may be connected via wired-USB to computing device 104. The VR headset 105 may receive wireless tracking data from the base station module(s) 124 and can relay the tracking data over the wired-USB connection to computing device 104. The VR headset 105 may then received wired-HDMI video, for example, and other USB signals from computing device 104.

In some implementations, one or more content/drawing servers (e.g., VR system 108) and one or more computer-readable storage devices can communicate with the computing devices 102 or 104 using network 101 to provide VR content and selectable tools to the devices 102 and 105. In some implementations, the network 101 can be a public communications network (e.g., the Internet, cellular data network, dialup modems over a telephone network) or a private communications network (e.g., private LAN, leased lines). In some implementations, the devices 102-108 can communicate with the network 101 using one or more high-speed wired and/or wireless communications protocols (e.g., 802.11 variations, wireless USB, WiFi, Bluetooth, Transmission Control Protocol/Internet Protocol (TCP/IP), Ethernet, IEEE 802.3, etc.).

In some implementations, the mobile device 102 can execute the VR application 112 and provide VR content and drawing capabilities to a user accessing the VR space. In some implementations, the computing device 104 can execute the VR application 112 and can provide VR content and drawing capabilities to a user accessing the VR space. The one or more servers and one or more computer-readable storage devices can communicate with the mobile device 102 and/or computing device 104 using the network 101 to provide VR content and drawing capabilities for VR headset 106.

In one non-limiting example, computing device 104 may function as a server device that executes a version of VR system 108. Device 102 may also run a version of VR system 108 and can act as a client device. In some implementations, both devices 102 and 104 may be configured as client devices and a server device (not shown) may function to provide VR content and operations to both devices 102 and 104.

The VR application 112 can include a pairing module 113 that can be configured to pair and un-pair particular user devices based on determining particular similar or dissimilar location information for the respective devices. For example, the pairing module 113 can use information from tracking system 110 to determine which tracked objects (e.g., controller 107 and/or VR headset 105) should be paired with a particular mobile device-based VR viewer (e.g., combined device 102 and 106). In some implementations, the pairing module 113 can determine which tracked controller (e.g., controller 103 rigidly attached to VR headset 105, for example) is connected to a particular mobile device functioning with a particular VR viewer 106.

The VR system 108 includes a movement tracking module 114 that can be configured to track user position and motion within the VR space in addition to tracking drawing content. For example, the movement tracking module 114 can employ a geometrical concept to determine user movement of input devices to generate drawing content and brush strokes.

The movement tracking module 114 can include capability for head tracking. For example, the VR headset 105 can determine directions that a user's head is moving. The user can nod, turn, or tilt her head to indicate which tool to select, which panel to access, and/or which other functionality to invoke or revoke. The tracked head positions can be analyzed to generate and render a properly aligned view of VR image content to VR headset 105, for example. The view may be analyzed to provide equivalent-like head tracking for a VR headset that does not perform head tracking (e.g., device 106). The additional analysis may be used to render similar content as shown in VR headset 105, in which the similar content represents properly rendered VR image content for display to a user accessing VR viewer 106.

In some implementations, the movement tracking module 114 may also include capability for gaze tracking. Gaze tracking can interface with one or more sensors, computing systems, cameras, and/or controls to detect gaze/eye movement associated with the user while the user is in the VR space. The one or more sensors, computing systems, cameras, and/or controls may be included in (e.g., housed in) VR headset 105, for example. The gaze tracking can track or monitor the direction of a user's eye gaze (i.e., tracking or monitoring where/which direction the user is looking). In general, gaze tracking may include tracking both the orientation and location of one eye or both eyes with respect to a defined coordinate system.

The tracking system 110 includes one or more base station modules 124 and orientation modules 128. The base station modules 124 can be coordinated with the VR space and can track absolute position and orientation information of objects in the VR space. The orientation module 128 can determine device and/or user orientation and provide such data to the pairing module 113.

In one non-limiting example, if the environment 100 determines a first user using VR viewer 106 with mobile device 102 is accessing a tracked object (e.g., a controller 107) within a predefined proximity to a user that is sketching in the VR space (e.g., a sketcher using controller 103) and the orientation module 128 determines that the first user is facing (or walking toward) the sketcher, the pairing module 113 can pair the mobile device 102 and the controller 107. The pairing can enable display, in the first user's VR viewer 106, the virtual drawing content being generated by the sketcher, for example. The display in the first user's VR viewer 106 may be from a perspective associated with the location of the first user. In particular, if the first user is using the mobile device 102 housed within the VR viewer 106 and the user rigidly attaches controller 107 to VR viewer 106, the environment 100 can begin to correlate data between the mobile device 102 and the controller 107 and infer that the two devices 107 and 102 are functioning together (e.g., moving in the same general way). Thus, the data of the mobile device 102 having three degrees of freedom of data can be correlated to data of the controller 107 having six degrees of freedom of data. The correlation may be automatically performed without user input. In this way, the mobile device 102 using VR viewer 106 can be provided six degrees of freedom of positional data from the controller 103 over a wireless connection and can render appropriate content on mobile device 102 based on the attachment to controller 107 and the inputs being rendered by another user using controller 103.

In addition, the systems and methods described herein can be configured to detect and react to movements such as head tilt behavior and/or eye gaze behavior associated with a user and a VR viewer/HMD device being worn by the user. The systems and methods can be used to detect and react accordingly to particular tool palettes and objects generated for drawing geometric content in 3D space.

In operation of VR system 108, the user is in control of an input device (e.g., such as a pointer object in a graphical user interface). When the pointer object is activated, the system 108 can record (e.g., store) the pointer object position. As the pointer object moves, the system 108 can measure the difference from a previously recorded pointer object position and generate drawing content as the user moves the pointer object.

In some implementations, the VR system 108 can provide a number of tool palettes in the VR space. The tool palettes can include selectable brushes, fabric swatches, colors (e.g., hues), patterns, cursors, panels, canvas simulators, shapes, surfaces, texturizers, or other selectable tools and templates used to generate drawing content in the VR space described herein.

Figure 2A:
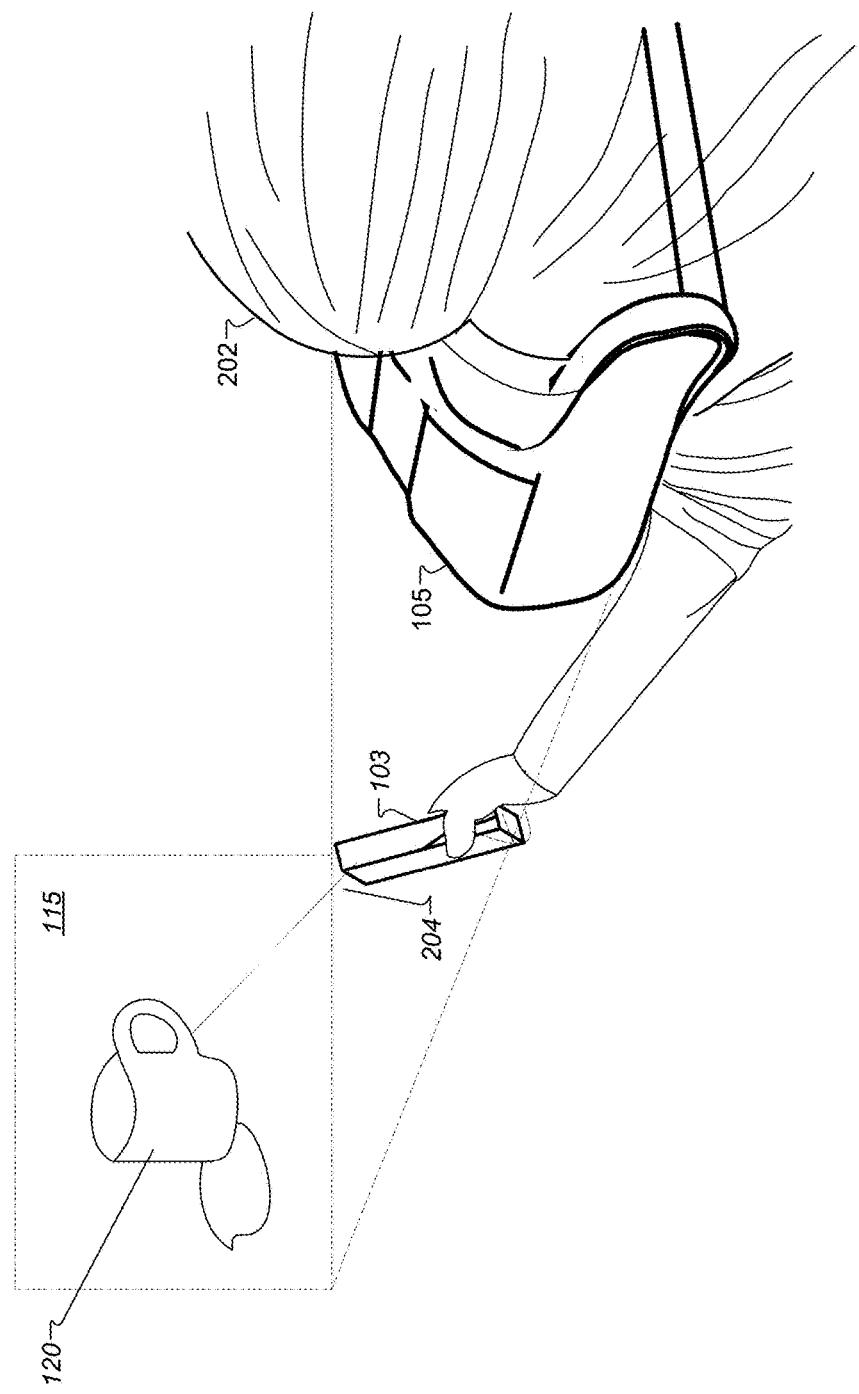
FIGS. 2A-2B are block diagrams that illustrate accessing virtual reality content with computing devices in the VR space of FIG. 1.

FIG. 2A is a diagram that illustrates a user 202 using the VR headset 105 to access VR content. To begin accessing VR system 108 and interface 115, the user 202 can put on the VR headset 105 by placing the VR headset 105 over her eyes. In some implementations, referring to FIG. 1, the VR headset 105 can interface with/connect to controller 103 and computing device 104, for example. The connection can provide the content to the VR headset 105 for display to the user on a screen included in the VR headset 105.

In the example shown in FIG. 2, the user 202 may be accessing VR system 108 and tracking system 110 by interfacing with content in system 108 using controller 103 (as indicated by line 204). The user 202 may be accessing a painting palette and may be drawing a coffee mug 120. The content shown in graphical user interface 115 is shown within a dotted line box because the depicted content is provided within the VR space that the user 202 is viewing in VR headset 105, for example.

The controller 103 can use the sensors to determine an absolute position and/or a detected rotation of the controller 103 in the VR space that can then be used as input to the VR space. For example, the controller 103 may be incorporated into the VR space as a mobile phone, a paintbrush, a pencil or pen, a drawing tool, a controller, a remote, or other object etc. Positioning of the controller 103 by the user 202 when incorporated into the VR space can allow the user to position the mobile phone, paintbrush, pencil or pen, drawing tool, controller, remote, or other object in the VR space.

In general, one or more input devices can be used to access content and provide input to the VR space. The input devices can include, but are not limited to, a touchscreen, a keyboard, one or more buttons, a trackpad, a touchpad, a pointing device, a mouse, a trackball, a joystick, a camera, and a microphone. A user interacting with an input device can cause a particular action to occur in the VR space.

While user 202 is drawing content for display in VR headset 105, for example, other users may be nearby and may wish to view the drawing being generated by the user 202. The systems and methods described in this disclosure can track users, devices, and drawing content within a VR space and provide the drawing content to the users in each respective HMD device (e.g., VR viewer 106) associated with each user. The provided drawing content can be provided in a real time fashion and in an orientation according to each determined device location.

Figure 2B:
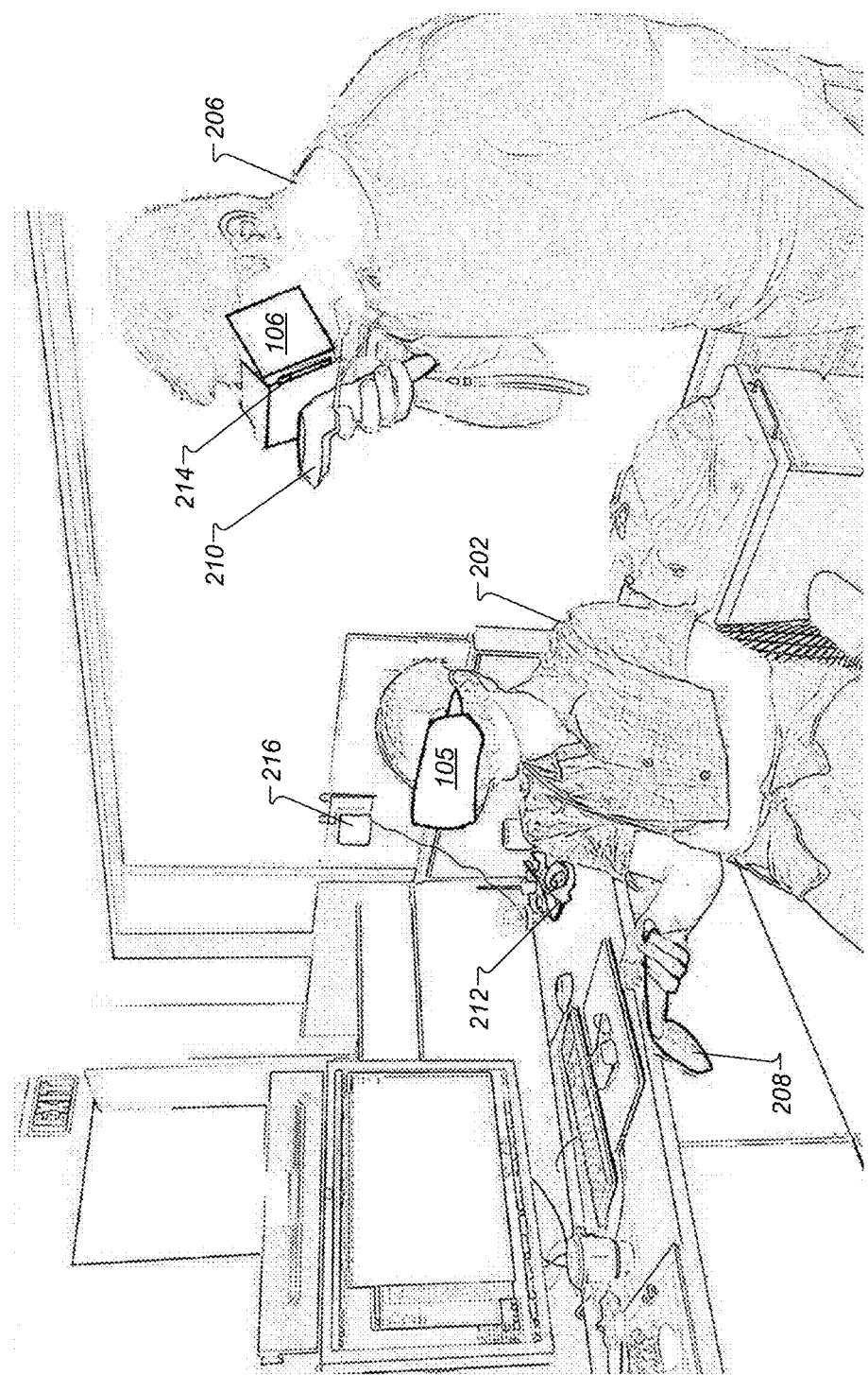

FIG. 2B is a diagram illustrating two users 202 and 206 accessing VR content using the environment 100. Here, the user 202 is wearing VR headset 105, which is shown as a VR device with extended display and tracking capabilities (as opposed to fewer tracking capabilities associated with VR viewer 106). In this example, a number of tracked objects are depicted as controllers 208, 210, and 212. Here, tracked controller/object 208 is being used with VR headset 105 by user 202. Tracked controller/object 210 is being used with VR viewer 106 by user 206. In this example, user 206 has rigidly attached tracked controller/object 210 to his VR viewer 106. VR viewer 106 is shown here with a mobile device 214 housed inside to be used as a mobile VR device to track and display VR content using three degrees of positional data freedom.

The base station 216 may be a base station module (such as module 124). Base station 216 can be used to track devices within environment 100. For example, base station 216 may be connected to VR headset 105 and one or more computing devices and may be configured to track controllers 208, 210, 212, and may compute position and orientation information for VR headset 105 and controllers 208-212.

In one non-limiting example, the tracking system 110 in combination with VR application 112 can determine which of controllers 208, 210, or 212 is connected to mobile device 214, for example. Here, the tracking system 110 can determine that controller 210 is connected to mobile device 214. In the example shown, a rubber band is used to rigidly connect device 214 to controller 210, however, any method in which to place controller 210, proximate to device 214, can be used. The rigid connection can be used by tracking system 110 to infer a particular relative orientation of both controller 210 and mobile device 214 based on the devices moving similarly with the user because they are rigidly connected. Similarly, tracking system 110 can infer that controller 212 is not connected to any of the viewers shown here since the controller 212 is not moving and not proximate to the users or other devices.

Upon inferring the relative orientation of controller 210 and mobile device 214, the tracking system 110 can trigger the communication of high-quality information from controller 210 to VR viewer 106. For example, the communication can enable streaming data from controller 210 to VR viewer 106 so that VR viewer 106 can display the same environment that VR headset 105 is currently displaying. The displayed content can be modified to provide the same environment as VR headset 105 that is properly oriented for a particular viewpoint associated with location and position of user 206.

Figure 3:
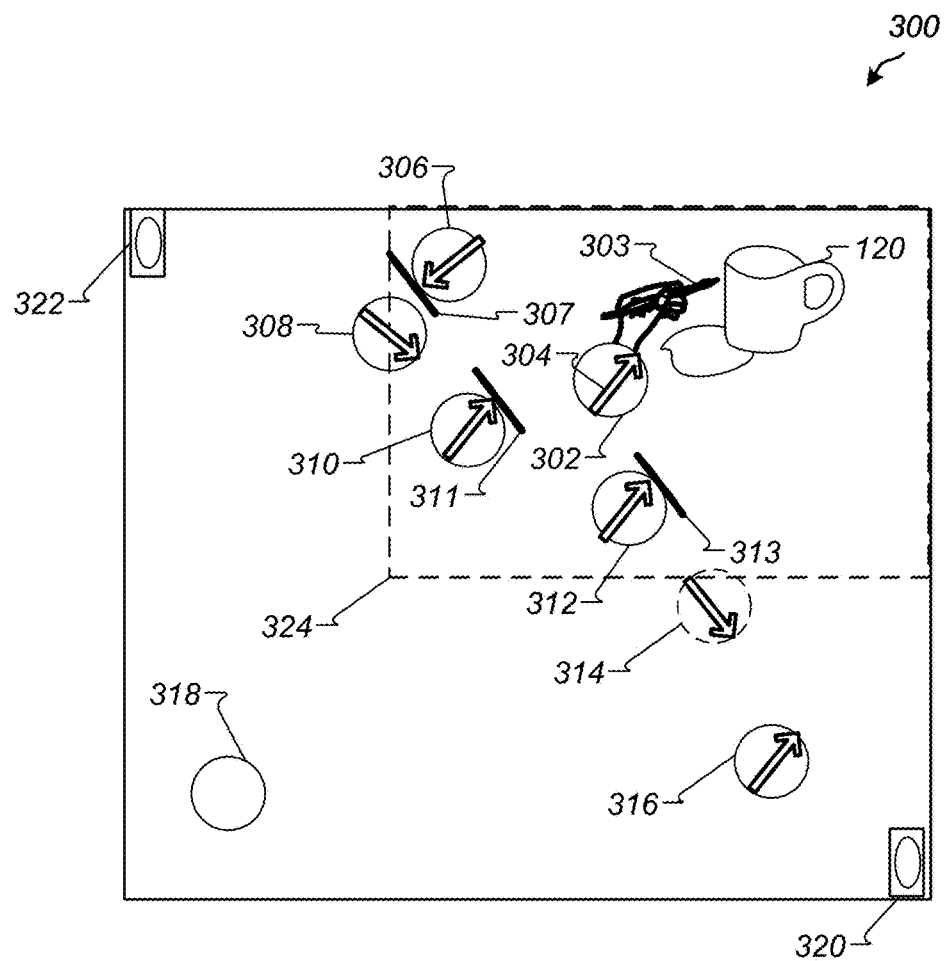
FIG. 3 is a diagram depicting an example VR space in which virtual content and objects are tracked.

FIG. 3 is a diagram depicting an example VR space 300 in which virtual content 120 and objects are tracked by environment 100, for example. As shown, a number of objects 302, 306, 308, 310, 312, 314, 316, and 318 are being accessed or used by users and tracked in VR space 300 in various ways. For example, object 302 may be a VR headset such as headset 105 worn by a user concurrently using object 303 as a tool to interact with content 120. Each of object 302 and object 303 may be tracked with a full six degrees of freedom of positional data. Objects 304, 306, 310, and 312 may represent VR viewers, such as VR viewer 106. Each of objects (e.g., VR viewers) 306, 310, and 312 are attached to respective objects 307, 311, and 313. Objects, 307, 311, and 313 may represent controllers or devices that may be tracked in six degrees of freedom, such as controller 103 or 107. For example, users accessing each VR viewer 306, 310, and 312, may rigidly attach each respective controller object 307, 311, and 313.

Users using objects 306-318 may be accessing the same VR space 300 and may be wearing VR viewers, such as VR viewer 106. As shown, objects 306, 310, and 312 may also be utilizing a controller, such as devices 103, 107, 210, 212, or 214. In the depicted example, arrows indicate a general direction that each user may be facing. The absence of an arrow may indicate that a particular object is not currently being tracked in the VR space 300. The determination to not track a particular object may be based on virtual location within the VR space, physical location, direction facing in the VR space, settings indicating not to track, and/or lack of detection of a trackable object etc.

In operation, elements shown in the environment 100 can measure aspects of VR space 300 by requesting and/or receiving information from one or more devices operating in the VR space 300. For example, in operation of environment 100 within VR space 300, the object 302 may be used by a user to interact with virtual reality content 120 and is shown by arrow 304 to be facing content 120. The tracking system 110 may track the object 302 based on user movements, and in some implementations, based on inputs or movements associated with a mobile device or controller, for example.

Other objects 306-316 may be tracked by components within the environment 100. In some implementations, the tracking may be in three degrees of freedom and may include tracking a general orientation, but not an absolute orientation. In other implementations, the tracking may be in six degrees of freedom (e.g., using tracking system 110). For example, the tracking system 110 can track attached devices 307, 311, and 313 with respect to objects 306, 310, and 312 in order to determine absolute position and absolute orientation information for such objects in the VR space. In addition, environment 100 can be configured to share data gathered by systems 108 and 110 to provide virtual reality content 120 to users accessing objects in the VR space. For example, environment 100 can ascertain which objects may be moving together by a single user.

To determine which objects may be moving together, the movement tracking system 110 may determine that object 310 is being moved in a similar way as object 311 and, in response, can infer that object 310 is attached to object 311 since the two objects are moving in a similar fashion. Tracking system 110 may include one or more base stations 320 or 322 to perform tracking and pairing determinations. In some implementations, pairing may include associating objects in the VR space rather than actually connecting the devices via cable or wireless communication. Pairing may refer to a mechanical attachment between objects. For example, a fastener, a band, or other connection adapted to seat one object near another object such that both objects move in similar planes as each other.

In some implementations, information from object 311 (tracked in three degrees of freedom) and object 311 (tracked in six degrees of freedom) can be combined by pairing module 113 to synchronize views of virtual reality content 120 in a VR viewer associated with object 310.

To determine whether to pair objects (e.g., devices associated with objects), the environment 100 can obtain data from mobile devices associated with users and data from controller (six degrees of freedom devices) associated with each respective user. For example, at some point, a user may rigidly attach her mobile device (e.g., object 312) to a controller (e.g., object 313) in a particular orientation. Upon attachment, the environment 100 can begin to correlate motions between what the mobile device indicates for position and orientation changes and what the controller indicates for position and orientation changes. For example, if object 312 is rotated by a user by ten degrees according to the mobile device and twelve degrees according to the object 313, the signals can be correlated each time a movement is made and measurements are taken. Over time, the environment 100 can infer a relationship between the two objects (e.g., the mobile device and the controller). Such inference can be used as a basis to pair those devices and provide information/displays according to actual position and orientation. Similarly, environment 100 can determine other correlations by analyzing similar acceleration patterns or deceleration patterns of movement occurring by both devices during a time period.

In one non-limiting example, environment 100 can verify orientation information. For example, object 312 may represent a mobile device (not shown) that is in communication with object 313 (e.g., controller 103 such as a Vive controller/tracker). The mobile device may broadcast that it has an orientation of [A], while the controller 103 broadcasts absolute orientation of [B]. The environment 100 can compute the difference and update the mobile device (or display content on the mobile device), accordingly. Using both metrics, the environment 100 can compute a relative orientation between the mobile device and the controller 103 to provide the mobile device with a calculated and absolute orientation. The mobile device can use the information to properly render content for the user accessing a VR viewer in the same VR space 300 as object 312.

In one non-limiting example, if the mobile device detects a device orientation toward or away (near or far) from a drawing that a sketcher (object 302) is actively working on, the mobile device can render content in a specific way. That is, the mobile device can render content from an angle corresponding to where the object 312 location, position, and orientation within the VR space 300. In this fashion, the object 312 can be provided display of content on an associated mobile device to view drawing content (or other virtual reality content) rendered according to location, position, and orientation of the mobile device user in the VR space.

At a high level, for example, the pairing module 113 can determine that the mobile devices associated with objects 306, 308, 310, and 312 should be connected to activities occurring with device 103, while objects 314, 316, and 318 should not be connected or paired or otherwise engaged in activities occurring with device 102 (e.g., virtual reality content 120). In some implementations, base stations 320 and 322 may provide additional locational detail for analysis. In one example, the environment 100 can determine that objects 314, 316, and 318 are not within range of boundary 324 or are faced away from content 120 and can predict that those objects are not likely to be associated with users that wish to view shared virtual reality content.

Figure 4:
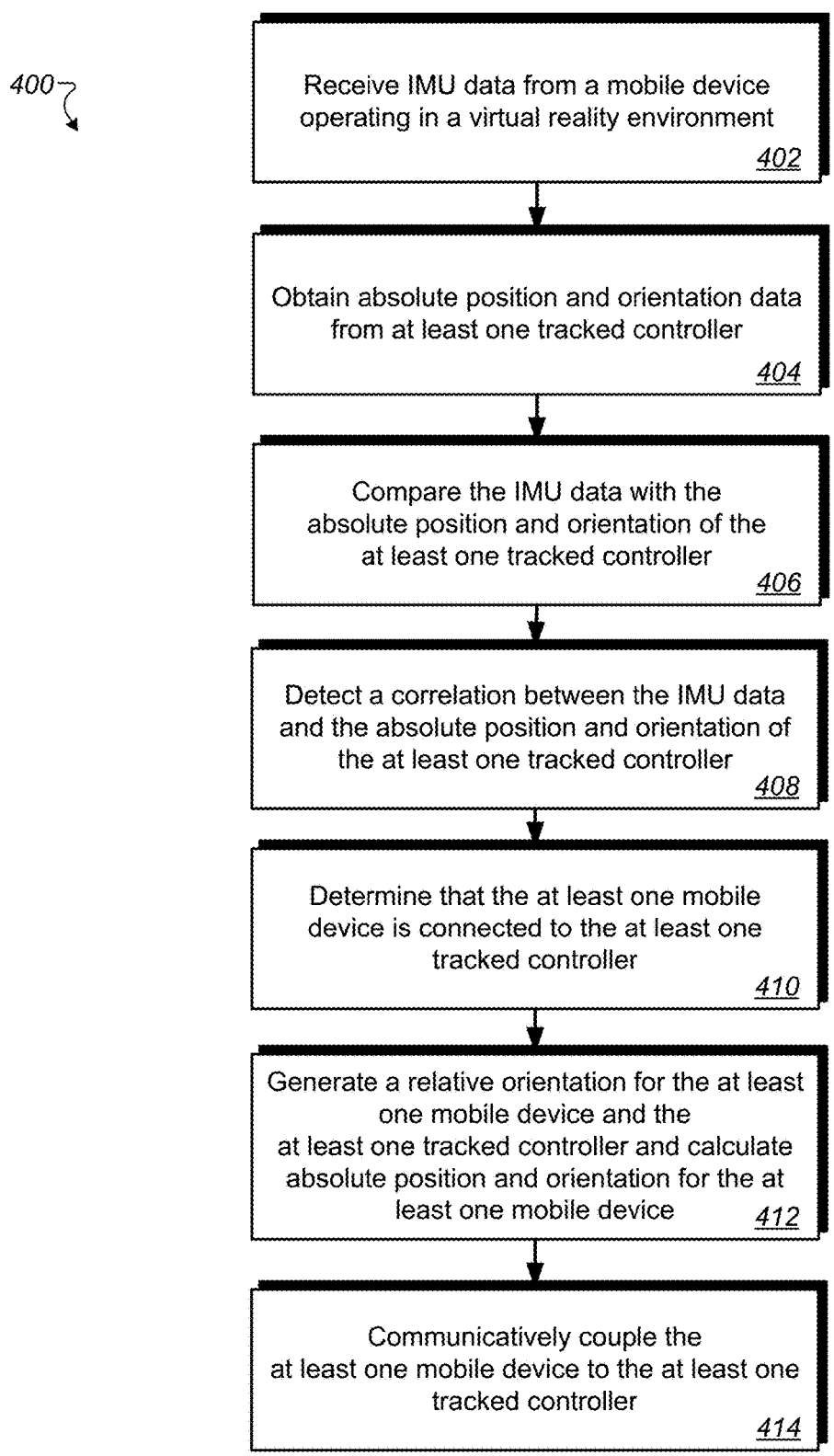
FIG. 4 is a flow chart of a process associated with the systems described herein.

FIG. 4 is a flow chart of a process 400 associated with the systems described herein. A user may launch VR application 112 on a mobile device 102. The mobile device 102 may benefit from determining and/or obtaining absolute position and orientation information for itself. Accordingly, the mobile device 102 may request to be provided the absolute position and orientation from the tracking system 110, for example. In some implementations, the environment 100 can estimate and infer the absolute position and orientation information based on information retrieved by tracking system 110 and VR system 108 (e.g., controller 107 locations, movements, etc.). System 100 may include any number of mobile devices accessing content and using VR application 112. System 110 can determine that one of the mobile devices is connected to a particular tracked controller. In addition, system 110 can determine which mobile device is connected to which of the tracked controllers.

At block 402, the process 400 may include receiving inertial measurement unit (IMU) data from at least one mobile device from a plurality of mobile devices operating in a virtual reality environment. For example, device 102 (and any other mobile devices in the VR space) may begin sending IMU data. The application 112 may be running on mobile device 102 (or other devices) and as such, application 112 can connect to computing device 104 to receive the IMU data.

At block 404, the process 400 may include obtaining absolute position and orientation data from at least one tracked controller from a plurality of controllers operating in the virtual reality environment. For example, controller 107 may be a six degrees of freedom-tracked device and as such, device 107 can detect and send/broadcast its own absolute tracking data (i.e., absolute position and orientation). Other controllers in environment 100 can also send/broadcast absolute tracking data to other devices and systems in environment 100.

At block 406, the process 400 may include comparing the IMU data from the at least one mobile device 102 with the absolute position and orientation of the at least one tracked controller 107. The comparison can begin, for example, in response to receiving a request to obtain absolute position and orientation of the at least one mobile device. For example, device 102 can request its own position data.

At block 408, the process 400 may include detecting a correlation between the IMU data from the at least one mobile device and the absolute position and orientation data of the at least one tracked controller. For example, device 104 can begin to cross-correlate particular mobile device IMU data with absolute tracking data for controller 107. The cross correlations may be based on common movements between the mobile device 102 and the controller 107. In some implementations, the detected correlation signifies that the VR viewer (e.g., device 102 combined with device 106) is rigidly attached to the at least one tracked controller (e.g., tracked controller 107).

At block 410, the process 400 may include determining that the at least one mobile device is connected to the at least one tracked controller. For example, device 104 can cross correlate IMU data with absolute tracking data and from this correlation, device 104 can infer that device 102 (or another mobile device) is connected to controller 107 (or another controller). Such a correlation can be made if, for example, the user rigidly attaches mobile device 102 to controller 107 (as shown in FIG. 1) because the movements will be detectably synced within a particular distance and orientation. The user does not have to preselect a particular controller, nor does the user have to inform device 102 which controller has been selected and attached to the user's mobile device 102. In one example, based on the detected correlation, data indicating that the at least one mobile device from the plurality of mobile devices is connected to the at least one tracked controller from the plurality of controllers can be stored. The stored data may be used to determine particular orientations and positions for the viewers (e.g., mobile devices) and trackers (e.g., controllers). At block 412, the process 400 may include generating a relative orientation for the at least one mobile device based on the stored data. For example, device 104 can determine a relative orientation of device 102 by retrieving accelerometer and gyroscope data from the device 102 and using such data to obtain an acceleration associated with movements carried out by device 102. The process 400 can then double integrate the acceleration over time to obtain a position for the device 102. The position for device 102 may provide a relative orientation with respect to a selected axis.

In some implementations, a relative orientation of device 102 can be retrieved using position sensors located within the VR space. The position sensors can provide data that can be used to triangulate a relative orientation for the mobile device 102 (or other device in the VR space). In a similar fashion, relative orientation information can be determined for controller 107. In some implementations, the absolute orientation can be used to calculate absolute position and orientation for the device 102.

In the event that a connection between device 102 and controller 107 is known beforehand, then device 104 can use this knowledge to calculate the absolute orientation and position of mobile device 102.

In some implementations, the process 400 determine absolute position and orientation data (e.g., coordinates) for the at least one mobile device based on the relative orientation for the at least one tracked controller.

At block 414, the process 400 may include communicatively coupling the at least one mobile device and the at least one tracked controller, the coupling being based on the determined absolute position and orientation for the at least one mobile device. For example, if a correlation is found, the environment 100 may couple devices and can begin communications in the VR space (e.g., messages, content, images, etc.) between device 104 and device 102.

In some implementations, communicatively coupling a mobile device to the a tracked controller 107 may include streaming data from the tracked controller 107 to the mobile device being used in a VR viewer 106 so that VR viewer 106 can display virtual reality content being used by another user accessing another controller (e.g., controller 103). In addition, the virtual reality content can be oriented to be displayed from a viewpoint associated with VR viewer 106.

In some implementations, the environment 100 may determine that there is no correlation between particular mobile devices and particular controllers. In response, device 104 can simply not respond to requests from those particular mobile devices. For example, process 400 may determine a lack of correlation between the IMU data from the at least one mobile device and the absolute position and orientation of the at least one tracked controller, and can respond to the request to obtain absolute position and orientation information with a communication indicating the lack of correlation.

In some implementations, the process 400 can include for each remaining mobile device in the plurality of mobile devices, determining which of the remaining mobile devices is connected to each of the plurality of tracked controllers.

In addition, the process 400 may include determining that a second mobile device from the plurality of mobile devices is connected to a second tracked controller from the plurality of controllers by analyzing movement and location data associated with both the second mobile device and the second tracked controller. The process 400 can include generating a relative orientation for the second mobile device and calculating absolute position and orientation for the second mobile device based on a tracked orientation for the second tracked controller. The process 400 may then include communicatively coupling the second mobile device to the second tracked controller. The coupling may be based at least in part on the calculated absolute position and orientation for the second mobile device.

In some implementations, the process 400 may include obtaining virtual reality content generated by the at least one tracked controller and re-rendering the content for display on the second mobile device based on the calculated absolute position and orientation for the second mobile device. For example, the process 400 can determine that a user accessing controller 103 is generating content that another user may wish to view. The system can re-render the content to provide a properly oriented view for the user accessing controller 107 and VR viewer 106. The re-rendered virtual content can be provided for display in the second mobile device (e.g., another VR viewer similar to VR viewer 106) according to the calculated absolute position and orientation for the second mobile device.

In some implementations, the systems described herein can include a tracking system that provides absolute position and orientation (i.e., ground truth) of one or more trackers. Such a tracking system may include, for example, an HTC Vive Lighthouse System™, Sixense STEM System™. The trackers may include, for example, HTC Vive™ controllers or Sixense STEM Pack™ controllers (e.g., controllers 103 or 107 shown in FIG. 1).

Users can access a viewer to consume virtual reality content. One example viewer may include a mobile device (e.g., a smartphone) placed within an HMD device. In some implementations, the viewer includes at least one IMU. The IMU may provide angular and linear acceleration data for the viewer (e.g., mobile device). In some implementations, the IMU may provide an orientation relative to a local magnetic North, for example. The viewer may have limitations in that an absolute position and orientation may not be ascertained without assistance from one or more other devices.

In some implementations, the systems described herein may include a dispatcher that can communicate with one or more tracking systems or one or more trackers (e.g., controllers). The dispatcher may communicate to receive tracking information about one or more trackers (e.g., controllers 103 or 107). The dispatcher may also receive IMU data from one or more viewers. An example dispatcher may include a desktop workstation, a laptop, or other computing device.

In some implementations, the systems described herein may include a network. The network may provide a wireless communication infrastructure for the systems described herein. In some implementations, the network can connect dispatchers to the tracking system. In some implementations, the network connects the dispatcher to one or more viewers using, for example, Bluetooth, Wi-Fi, wireless USB, etc.

In operation of environment 100, a user may launch the VR application 112 on a viewer 102/106. The viewer 102/106 may wish to receive absolution position and orientation of itself within a VR space. The application 112 executing on the viewer 102/106 may connect to a dispatcher (e.g., laptop 104) to begin sending IMU data. The application 112 may request to receive an absolute positon and orientation for the viewer 102/106.

The dispatcher 104 may begin to cross-correlate the viewer IMU data with absolute tracking data detected by one or more trackers (e.g. controller 103 or 107 in this example). If the viewer 102/106 is not rigidly attached to any of the trackers (e.g., controller 103 or 107 in this example), a correlation may not be determined and thus, the dispatcher 104 may not reply to the viewer request.

If instead, the user has rigidly attached the viewer 102/106 to a tracker (e.g., controller 107), then the dispatcher 104 cross-correlation can occur because the movements between the tracked controller 107 and the IMU data of the viewer 102/107 can be determined to coincide with the same directional changes within the VR space.

In some implementations, the correlation between the IMU data from at least one mobile device and the absolute position and orientation data of at least one tracked controller can be detected by determining a number of common directional movements being carried out by both the at least one mobile device and the at least one tracked controller in the virtual reality environment. The directional movements may refer to a movement from a first point to a second point performed by the mobile device and a movement from a third point (parallel to the first point) to a fourth point (parallel to the second point) performed by a controller. In some implementations, the two movements move in tandem and in parallel because the mobile device and the controller are physically connected (via permanent or temporary means).

In some implementations, the detected correlation signifies that the VR viewer (e.g., device 102 combined with device 106) is rigidly attached to the at least one tracked controller (e.g., tracker 107).

The dispatcher 104 can infer that the viewer 102/106 is connected to controller 107 based on the cross-correlations. Such an inference can be ascertained without explicit user intervention. For example, the user need not register or couple viewer 102/106 to controller 107, but the system can use common movements between such devices to automatically determine that the devices 102/106 and 107 are rigidly attached and moving in a similar fashion. From such data, the dispatcher 104 can infer (e.g., determine) a relative orientation of the viewer 102/106 and the controller 107. From the relative orientation, an absolute orientation of the viewer 102/106 can be calculated.

If a particular connection between the viewer 102/106 and tracked controller 107 is known beforehand (e.g., based on, for example, if the user uses a cradle whose geometry (e.g., slot/connection between viewer 101/106 and tracker 107 is known by the system), then the dispatcher 104 may use such knowledge to calculate an absolute orientation and position of the viewer 102/106. Thus, the cross correlation may not be used to determine such positions.

Upon determining the absolute position and orientation of the viewer, the dispatcher 104 (e.g., device 104) may begin to communicate the absolute orientation of the viewer 102/106 and the absolute position of tracked controller 107 (and/or may communicate the absolute position of the viewer 102/106, if possible).

In some implementations, communicatively coupling the at least one mobile device and the at least one tracked controller includes wirelessly communicating sensed data from the at least one tracked controller to the at least one mobile device. For example, the at least one mobile device 102 (combined with device 106, for example) may wirelessly transmit positional data and other sensed data over Bluetooth, Wi-Fi, wireless USB, etc. In some implementations, the communicative coupling provides enhanced sensed data to be communicated from the at least one tracked controller to the at least one mobile device. Various mobile devices within environment 100 can communicate data to and receive data from one or more other controllers within the same environment 100.

In some implementations, the at least one mobile device described herein can include (or be part of) a VR viewer that provides at least three degrees of freedom of data. The at least one tracked controller described herein may provide at least six degrees of freedom of data. Rigidly attaching the two can be used to provide the benefit of six degrees of freedom of data to the mobile device having only three degrees of freedom of data if the mobile device is not correlated with the controller.

In some implementations, the process 400 may also include determining that the at least one mobile device is associated with the at least one tracked controller. For example, if the environment 100 detects a correlation between the IMU data from the at least one mobile device and the absolute position and orientation data of the at least one tracked controller, then the at least one mile device may be associated with the at least one tracked controller. If such an association can be determined, the process 400 can include providing virtual reality content to the at least one mobile device according to the determined absolute position and orientation for the at least one mobile device. For example, the virtual reality content may be provided to the at least one mobile device according to particular determined position and orientation data. Such data can be used to determine position and orientation data for other (e.g., additional) mobile devices using the virtual environment.

In response to determining that one or more additional mobile devices are accessing the virtual reality environment within a predefined proximity to the at least one tracked controller, the process 400 can include providing the virtual reality content to the one or more additional mobile devices. The virtual reality content may be provided to the one or more additional mobile devices in an adjusted fashion. For example, the virtual reality content may be provided for a determined relative orientation generated for the one or more additional mobile devices. Providing virtual reality content according to the determined relative orientation for a mobile device can ensure that the user accessing a viewer (associated with such a mobile device) can be provided content from an angle or area that correlates to a user generating the virtual reality content. In particular, if a first user is accessing the at least one mobile device correlated to the at least one controller, the first user may be drawing virtual content within the VR space. The drawings can be provided in real time to a second user (e.g., and/or a third and fourth user) accessing other mobile devices (e.g., VR viewers) within the same VR space. The content can be provided in an adjusted angle or location to mimic the second user location in the virtual environment with respect to the first user (i.e., the mobile device and controller being accessed by the first user).

Figure 5:
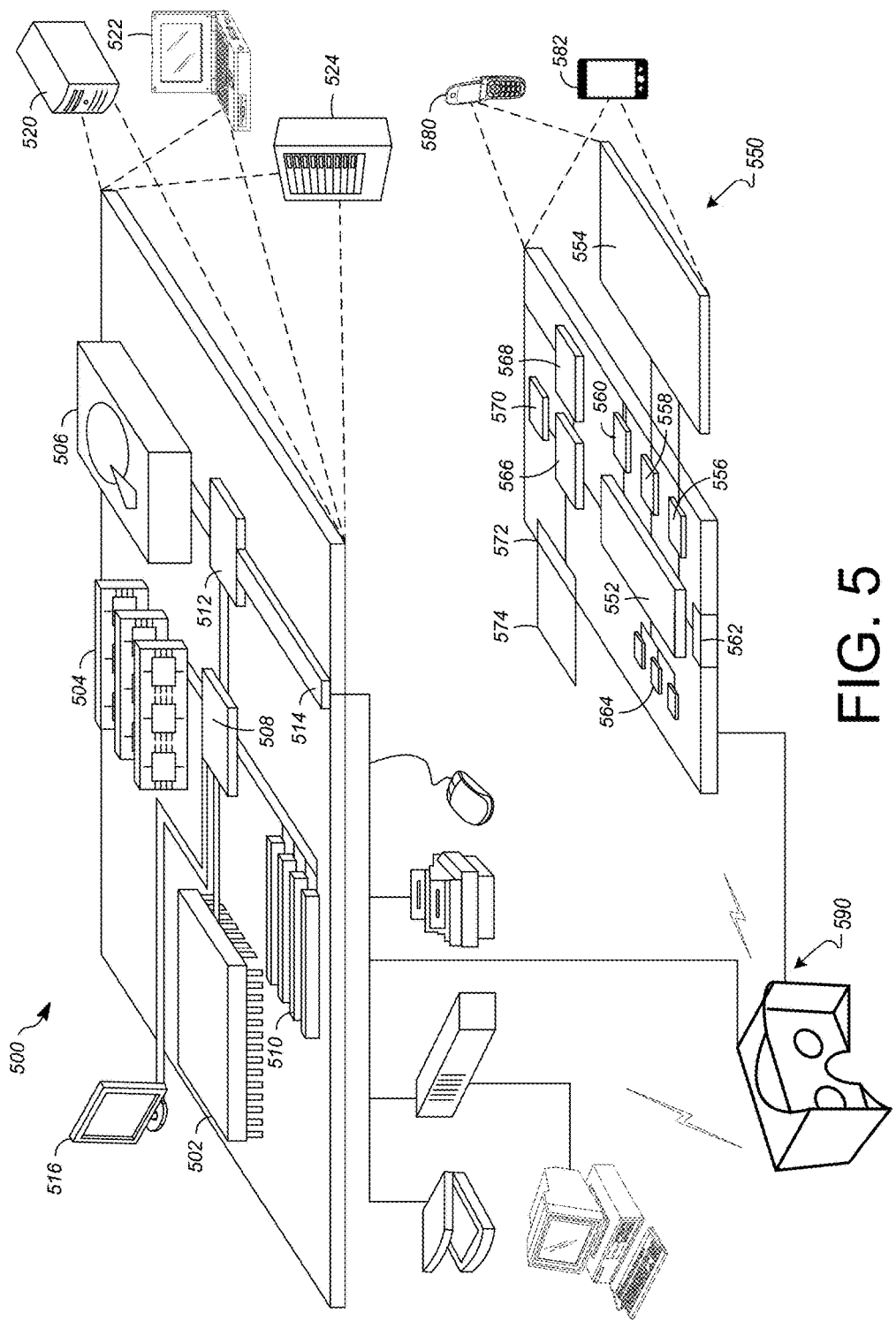
FIG. 5 shows an example of a computer device and a mobile computer device that can be used to implement the techniques described herein.

FIG. 5 shows an example of a generic computer device 500 and a generic mobile computer device 550, which may be used with the techniques described here. Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. In addition, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to perform or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, Wi-Fi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 5 can include sensors that interface with a virtual reality (VR headset 590). For example, one or more sensors included on a computing device 550 or other computing device depicted in FIG. 5, can provide input to VR headset 590 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 550 can use the sensors to determine an absolute position and/or a detected rotation of the computing device in the VR space that can then be used as input to the VR space. For example, the computing device

550 may be incorporated into the VR space as a virtual object, such as a controller, a laser pointer, a keyboard, a weapon, etc. Positioning of the computing device/virtual object by the user when incorporated into the VR space can allow the user to position the computing device to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 550 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 550 when the computing device is incorporated into the VR space can cause a particular action to occur in the VR space.

In some implementations, a touchscreen of the computing device 550 can be rendered as a touchpad in VR space. A user can interact with the touchscreen of the computing device 550. The interactions are rendered, in VR headset 590 for example, as movements on the rendered touchpad in the VR space. The rendered movements can control objects in the VR space.

In some implementations, one or more output devices included on the computing device 550 can provide output and/or feedback to a user of the VR headset 590 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 550 may appear as another object in a computer-generated, 3D environment. Interactions by the user with the computing device 550 (e.g., rotating, shaking, touching a touchscreen, swiping a finger across a touch screen) can be interpreted as interactions with the object in the VR space. In the example of the laser pointer in a VR space, the computing device 550 appears as a virtual laser pointer in the computer-generated, 3D environment. As the user manipulates the computing device 550, the user in the VR space sees movement of the laser pointer. The user receives feedback from interactions with the computing device 550 in the VR space on the computing device 550 or on the VR headset 590.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
receiving, by a computing device, inertial measurement unit (IMU) data from at least one mobile device of a plurality of mobile devices operating in a virtual reality environment;
obtaining absolute position and orientation data from at least one tracked controller of a plurality of controllers operating in the virtual reality environment;
in response to receiving, by the computing device, a request to determine absolute position and orientation data for the at least one mobile device, comparing the IMU data from the at least one mobile device with the absolute position and orientation data of the at least one tracked controller;
responsive to detecting, by the computing device, a correlation between the IMU data from the at least one mobile device and the absolute position and orientation data of the at least one tracked controller:
storing, by the computing device, data indicating that the at least one mobile device from the plurality of mobile devices is associated with the at least one tracked controller from the plurality of controllers,
generating a relative orientation for the at least one mobile device based on the stored data,
determining absolute position and orientation for the at least one mobile device based on the relative orientation for the at least one tracked controller, and
communicatively coupling the at least one mobile device and the at least one tracked controller, the coupling being based on the determined absolute position and orientation for the at least one mobile device.

2. The method of claim 1, wherein communicatively coupling the at least one mobile device and the at least one tracked controller includes wirelessly communicating sensed data from the at least one tracked controller to the at least one mobile device.

3. The method of claim 2, wherein the communicative coupling provides sensed position data and orientation data associated with the at least one tracked controller to be communicated from the at least one tracked controller to the at least one mobile device.

4. The method of claim 1, wherein the correlation between the IMU data from the at least one mobile device and the absolute position and orientation data of the at least one tracked controller is detected by determining a plurality of common directional movements being carried out by both the at least one mobile device and the at least one tracked controller in the virtual reality environment.

5. The method of claim 1, wherein the at least one mobile device includes a virtual reality viewer that provides at least three degrees of freedom of data and the at least one tracked controller provides six degrees of freedom of data.

6. The method of claim 1, wherein the detected correlation signifies that the mobile device is rigidly attached to the at least one tracked controller.

7. The method of claim 1, further comprising:
determining a lack of correlation between the IMU data from the at least one mobile device and the absolute position and orientation of the at least one tracked controller; and
responding to the request with a communication indicating the lack of correlation.

8. The method of claim 1, further comprising:
providing virtual reality content to the at least one mobile device according to the determined absolute position and orientation for the at least one mobile device; and
in response to determining that one or more additional mobile devices are accessing the virtual reality environment within a predefined proximity to the at least one tracked controller, providing the virtual reality content to the one or more additional mobile devices, the virtual reality content provided to the one or more additional mobile devices being adjusted for a determined relative orientation generated for the one or more additional mobile devices.

9. A non-transitory, machine-readable medium having instructions stored thereon, the instructions, when executed by a processor, cause a computing device to:
receive, by a computing device, inertial measurement unit (IMU) data from at least one mobile device of a plurality of mobile devices operating in a virtual reality environment;
obtain absolute position and orientation data from at least one tracked controller of a plurality of controllers operating in the virtual reality environment;
in response to receiving, by the computing device, a request to determine absolute position and orientation data for the at least one mobile device, compare the IMU data from the at least one mobile device with the absolute position and orientation data of the at least one tracked controller;
responsive to detecting, by the computing device, a correlation between the IMU data from the at least one mobile device and the absolute position and orientation data of the at least one tracked controller:
storing data indicating that the at least one mobile device from the plurality of mobile devices is connected to the at least one tracked controller from the plurality of controllers,
generating a relative orientation for the at least one mobile device based on the stored data,
determining absolute position and orientation for the at least one mobile device based on the relative orientation for the at least one tracked controller, and
communicatively coupling the at least one mobile device and the at least one tracked controller, the coupling being based on the determined absolute position and orientation for the at least one mobile device.

10. The machine-readable medium of claim 9, wherein communicatively coupling the at least one mobile device and the at least one tracked controller includes wirelessly communicating sensed data from the at least one tracked controller to the at least one mobile device.

11. The machine-readable medium of claim 10, wherein the communicative coupling provides sensed position data and orientation data associated with the at least one tracked controller to be communicated from the at least one tracked controller to the at least one mobile device.

12. The machine-readable medium of claim 9, wherein the correlation between the IMU data from the at least one mobile device and the absolute position and orientation data of the at least one tracked controller is detected by determining a plurality of common directional movements being carried out by both the at least one mobile device and the at least one tracked controller in the virtual reality environment.

13. The machine-readable medium of claim 9, wherein the at least one mobile device includes a virtual reality viewer that provides at least three degrees of freedom of data and the at least one tracked controller provides six degrees of freedom of data.

14. The machine-readable medium of claim 9 wherein the detected correlation signifies that the mobile device is rigidly attached to the at least one tracked controller.

15. The machine-readable medium of claim 9, further comprising:
providing virtual reality content to the at least one mobile device according to the determined absolute position and orientation for the at least one mobile device; and
in response to determining that one or more additional mobile devices are accessing the virtual reality environment within a predefined proximity to the at least one tracked controller, providing the virtual reality content to the one or more additional mobile devices, the virtual reality content provided to the one or more additional mobile devices being adjusted for a determined relative orientation generated for the one or more additional mobile devices.

16. A system comprising:
memory; and
at least one processor coupled to the memory, the at least one processor being configured to:
receive, by a computing device, inertial measurement unit (IMU) data from at least one mobile device of a plurality of mobile devices operating in a virtual reality environment;
obtain absolute position and orientation data from at least one tracked controller of a plurality of controllers operating in the virtual reality environment;
in response to receiving, by the computing device, a request to determine absolute position and orientation data for the at least one mobile device, compare the IMU data from the at least one mobile device with the absolute position and orientation data of the at least one tracked controller;
responsive to detecting, by the computing device, a correlation between the IMU data from the at least one mobile device and the absolute position and orientation data of the at least one tracked controller:
storing data indicating that the at least one mobile device from the plurality of mobile devices is connected to the at least one tracked controller from the plurality of controllers,
generating a relative orientation for the at least one mobile device based on the stored data,
determining absolute position and orientation for the at least one mobile device based on the relative orientation for the at least one tracked controller, and
communicatively coupling the at least one mobile device and the at least one tracked controller, the coupling being based on the determined absolute position and orientation for the at least one mobile device.

17. The system of claim 16, wherein communicatively coupling the at least one mobile device and the at least one tracked controller includes wirelessly communicating sensed data from the at least one tracked controller to the at least one mobile device.

18. The system of claim 16, wherein the correlation between the IMU data from the at least one mobile device and the absolute position and orientation data of the at least one tracked controller is detected by determining a plurality of common directional movements being carried out by both the at least one mobile device and the at least one tracked controller in the virtual reality environment.

19. The system of claim 16, wherein the at least one mobile device includes a virtual reality viewer that provides at least three degrees of freedom of data and the at least one tracked controller provides six degrees of freedom of data.

20. The system of claim 16, wherein the detected correlation signifies that the mobile device is rigidly attached to the at least one tracked controller.

* * * * *

UNITED STATES PATENT AND TRADEMARK OFFICE
CERTIFICATE OF CORRECTION

PATENT NO. : 10,345,925 B2  
APPLICATION NO. : 15/666885  
DATED : July 9, 2019  
INVENTOR(S) : Du Bois et al.

Page 1 of 1

It is certified that error appears in the above-identified patent and that said Letters Patent is hereby corrected as shown below:

On the Title Page

On Page 2, Column 2, item (56), under "OTHER PUBLICATIONS", Line 7, delete "you" and insert -- your --, therefor.

On Page 2, Column 2, item (56), under "OTHER PUBLICATIONS", Line 8, delete "(httpJJwww.IoNIDgaek.oom/" and insert -- (http:// www.IoNIDgeek.com/ --, therefor.

Signed and Sealed this  
Fifteenth Day of October, 2019

Andrei Iancu  
*Director of the United States Patent and Trademark Office*